United States Patent
Ohashi et al.

(10) Patent No.: US 7,553,471 B2
(45) Date of Patent: Jun. 30, 2009

(54) METHOD OF MANUFACTURING HYDROPHILIC CARBON NANOTUBES

(75) Inventors: Toshiyuki Ohashi, Wako (JP); Hiroshi Sugahara, Himeji (JP); Mitsuaki Mitama, Chiyoda-ku (JP)

(73) Assignees: Honda Motor Co., Ltd., Tokyo (JP); Ushiodenki Kabushiki Kaisha, Tokyo (JP)

( * ) Notice: Subject to any disclaimer, the term of this patent is extended or adjusted under 35 U.S.C. 154(b) by 557 days.

(21) Appl. No.: 11/088,320

(22) Filed: Mar. 23, 2005

(65) Prior Publication Data

US 2005/0214196 A1    Sep. 29, 2005

(30) Foreign Application Priority Data

Mar. 23, 2004  (JP) ............................. 2004-085558

(51) Int. Cl.
*D01F 9/12*    (2006.01)
(52) U.S. Cl. ...................... 423/447.1; 977/847; 977/848
(58) Field of Classification Search ............. 423/447.1, 423/447.2, 447.6, 447.7, 460; 524/496; 977/847, 977/848
See application file for complete search history.

(56) References Cited

U.S. PATENT DOCUMENTS 6,503,464 B1 * 1/2003 Miki et al. ................ 422/186.3
7,122,165 B2 * 10/2006 Wong et al. .............. 423/447.2
7,317,277 B2 * 1/2008 Cheng et al. ................ 313/311
2005/0036905 A1    2/2005 Gokturk

FOREIGN PATENT DOCUMENTS

WO    WO-96/18059    6/1996

OTHER PUBLICATIONS

Smalley et al. "Fullerene Pipes", Science, vol. 280, May 22, 1988, pp. 1253-1256.
Savage T. et al: "Photoinduced oxidation of carbon nanotubes", Journal of Physics: Condensed Matter IOP Publishing UK, vol. 15, No. 35, Sep. 10, 2003, pp. 5915-5921, XP002331779, ISSN: 0953-8984.
Cui, J. et al: "Reversible sidewall osmylation of individual carbon nanotubes", Nano Letters American Chem. Soc USA, vol. 3, No. 5, May 2003, pp. 613-615, XP002331780, ISSN: 1530-6984.

(Continued)

*Primary Examiner*—Wayne Langel
*Assistant Examiner*—Brittany M Martinez
(74) *Attorney, Agent, or Firm*—Lahive & Cockfield, LLP; Anthony A. Laurentano, Esq.

(57) ABSTRACT

There is provided a method of manufacturing hydrophilic carbon nanotubes, which is capable of imparting hydrophilicity without damaging the surface of the carbon nanotubes. By irradiating carbon nanotubes 4 with ultraviolet ray 3, hydrophilic functional group(s) are introduced into the surface of carbon nanotubes 4. Hydrophilicity is imparted to the carbon nanotubes to such an extent that a contact angle of water is in the range of less than 130°. Ultraviolet ray 3 is a far ultraviolet ray having a wavelength ranging from 1 to 190 nm. The irradiation with ultraviolet ray 3 is conducted in the presence of oxygen and hydrogen or in the presence of ozone and hydrogen. The end part(s) of carbon nanotubes 4 is opened by the irradiation with ultraviolet ray 3.

14 Claims, 2 Drawing Sheets

OTHER PUBLICATIONS

Zhao W-J et al: "Field emission characteristics of screen-printed carbon nanotube after laser irradiation", Japanese Journal of Applied Physics, Publication Office Japanese Journal of Applied Physics, Tokyo, JP, vol. 41, No. 6B, Part 1, Jun. 2002, pp. 4314-4316, XP001163422, ISSN: 0021-4922.

Kim, J.S. et al: "Ultraviolet laser treatment of multiwall carbon nanotubes grown at low temperature", Applied Physics Letters, American Institute of Phusics, New York, US, vol. 82, No. 10, Mar. 10, 2003, pp. 1607-1609, XP012033494, ISSN: 0003-6951.

Encyclopedia Britannica Online, "Ultraviolet radiation," (2008).

Niyogi, S. et al., "Chemistry of Single-Walled Carbon Nanotubes," *Acc. Chem. Res.*, vol. 35:1105-1113 (2002).

\* cited by examiner

METHOD OF MANUFACTURING HYDROPHILIC CARBON NANOTUBES

BACKGROUND OF THE INVENTION

1. Field of the Invention

The present invention relates to a method of manufacturing hydrophilic carbon nanotubes.

2. Description of the Related Art

A carbon nanotube is a single tubular molecule where a large number of carbon atoms are continuously bonded in such a state that six-membered rings are formed by $sp^2$ bonding and possesses a structure of nanometer order. The end part of the carbon nanotube is closed with forming a hemispherical structure by incorporating five-membered rings in part. Moreover, the above carbon nanotubes form single-layered tubes, or tubes of various sizes are sometimes layered in a nested form to form multi-layered tubes.

The above carbon nanotubes are expected to have application to various uses such as one-dimensional wires, catalysts, cold-cathode elements, and hydrogen storage substances owing to mechanical and structural properties derived from its specific structure. However, the carbon nanotubes have a structure where a large number of carbon atoms are continuously bonded and hence is low in chemical activity and poor in wetting ability toward water and various organic solvents. Furthermore, the carbon nanotubes have characteristics to aggregate itself by mutual intermolecular force. As a result, the carbon nanotubes have a problem that it is difficult to disperse it in water or various organic solvents.

For solving the above problem, there is known a technology that chemical modification is applied to the carbon nanotubes to impart hydrophilicity to the surface thereof.

As the process for applying the chemical modification, there is a process of opening the end part(s) of the carbon nanotubes by immersing the carbon nanotubes in a mixed acid of sulfuric acid and nitric acid and irradiating the same with an ultrasonic wave to effect oxidation treatment. In the process, it is considered that a carboxyl group is bonded to the opened end(s) of the carbon nanotubes (Smalley et al., SCIENCE, vol. 280, 22 May 1988, p. 1253-1256).

As an alternative process, there is known a process of bringing the carbon nanotubes into contact with a strong oxidizing agent such as nitric acid or sulfuric acid for a sufficient time to oxidize the surface and subsequently bringing the oxidized surface of the carbon nanotubes into contact with a suitable reactant. By the above process, hydrophilic functional group(s) can be introduced into the surface of the carbon nanotubes (WO96/18059).

However, in the wet process using sulfuric acid, nitric acid, or the like as mentioned above, hydrophilicity can be imparted to the carbon nanotubes by bonding the hydrophilic functional group(s) thereto but there arises an inconvenience that the structure of the carbon nanotubes themselves are damaged by the acid. Moreover, in the above wet process, closest attention should be paid at operations owing to the use of sulfuric acid, nitric acid, or the like and also there may be a possible economical disadvantage in the case that sulfuric acid, nitric acid, or the like is used in a large amount.

SUMMARY OF THE INVENTION

An object of the present invention is to provide a method of manufacturing hydrophilic carbon nanotubes capable of imparting hydrophilicity to carbon nanotubes without damaging the surface of the carbon nanotubes, which overcomes such an inconvenience.

In order to achieve such an object, the manufacturing method of the invention is characterized by introducing hydrophilic functional group(s) into the surface of carbon nanotubes by irradiating the carbon nanotubes with an ultraviolet ray.

As mentioned above, since carbon nanotubes possesses the structure where a large number of carbon atoms are continuously bonded in such a state that six-membered rings are formed by $sp^2$ bonding, the carbon-carbon bond which forms the $sp^2$ bonding is cleaved by the energy of the ultraviolet ray when the ultraviolet ray is applied. Carbon atoms at the cleaved parts react with oxygen, nitrogen, hydrogen, and the like present in the neighboring atmosphere to form hydrophilic functional group(s), and thereby hydrophilicity is introduced into the surface of the carbon nanotubes. The hydrophilic functional groups include a hydroxyl group (—OH), a carbonyl group (—CO—), an aldehyde group (—CHO), a carboxyl group (—COOH), a nitro group (—$NO_2$), an amino group (—$NH_2$), and the like.

According to the method of manufacturing of the invention, the hydrophilicity can be imparted without damaging the surface of the carbon nanotubes because a strong oxidizing agent such as sulfuric acid or nitric acid is not used.

The hydrophilicity is, for example, represented by the contact angle of water toward the carbon nanotubes. According to the manufacturing method of the invention, hydrophilicity of a contact angle ranging less than 130°, preferably 110° or less, further preferably 10° or less is imparted to the carbon nanotubes.

In the manufacturing method of the invention, the ultraviolet ray may be any ray having a wavelength of less than 400 nm but is preferably a far ultraviolet ray having a wavelength ranging from 1 to 190 nm. Since the bonding energy of the carbon-carbon bond forming $sp^2$ bonding is 590 kJ/mol, the carbon-carbon bond can be easily cleaved by the photon energy of the ultraviolet ray having a wavelength of the above range. When the wavelength of the ultraviolet ray is more than 190 nm, the carbon-carbon bond cannot be cleaved sometimes owing to the small energy of the ultraviolet ray. Moreover, when the wavelength is less than 1 nm, the ray falls within X-ray region, so that protection against X-ray becomes necessary.

Moreover, the irradiation with the ultraviolet ray may be conducted under the air or under a nitrogen atmosphere, but is preferably conducted in the presence of oxygen and hydrogen. By conducting the irradiation in the presence of oxygen and hydrogen, the above hydrophilic functional groups such as a hydroxyl group (—OH), a carbonyl group (—CO—), an aldehyde group (—CHO), a carboxyl group (—COOH), and the like can be easily introduced into the above carbon nanotubes.

In order to further facilitate the introduction of the hydrophilic functional group(s), the irradiation with the ultraviolet ray is preferably conducted in the presence of ozone and hydrogen. When ozone is present, it acts on oxygen atom in the atmosphere to form an oxygen radical having a strong oxidizing power and the oxygen radical accelerates the cleavage of the carbon-carbon bond and, at the same time, oxygen combines with the cleaved part. The ozone may be ozone formed by irradiating oxygen with the ultraviolet ray.

Moreover, in the manufacturing method of the invention, by the irradiation with the ultraviolet ray, the end part(s) of the carbon nanotubes are opened and thereby further larger hydrophilicity can be imparted to the carbon nanotubes. The end part of the carbon nanotubes are closed with forming a hemispherical structure by incorporating five-membered rings into the six-membered rings in part. As a result, the above end part has large strain energy as compared with the part of tube flank composed of only six-membered rings and hence is unstable. Therefore, the end part of the carbon nanotubes can be easily opened by the irradiation with the ultraviolet ray and the carbon at the opened part reacts with oxygen, nitrogen, hydrogen, and the like present in the neighboring atmosphere to form bonds with the above hydrophilic functional group(s).

DETAILED DESCRIPTION OF THE INVENTION

The following will describe embodiments of the invention further in detail with reference to attached drawings.

The manufacturing method of the present embodiment produces hydrophilic carbon nanotubes by introducing a hydrophilic functional group into the surface of raw carbon nanotubes by irradiating the carbon nanotubes with an ultraviolet ray.

As the raw hydrophilic carbon nanotubes, carbon nanotubes produced by a method known per se, such as chemical vapor deposition method (CVD method), can be used. For example, the raw carbon nanotubes have a diameter ranging from 0.4 to 100 nm and possess an aspect ratio of 10 to 10000. The carbon nanotubes may be single-layered carbon nanotubes or multilayered carbon nanotubes.

Figure 1:
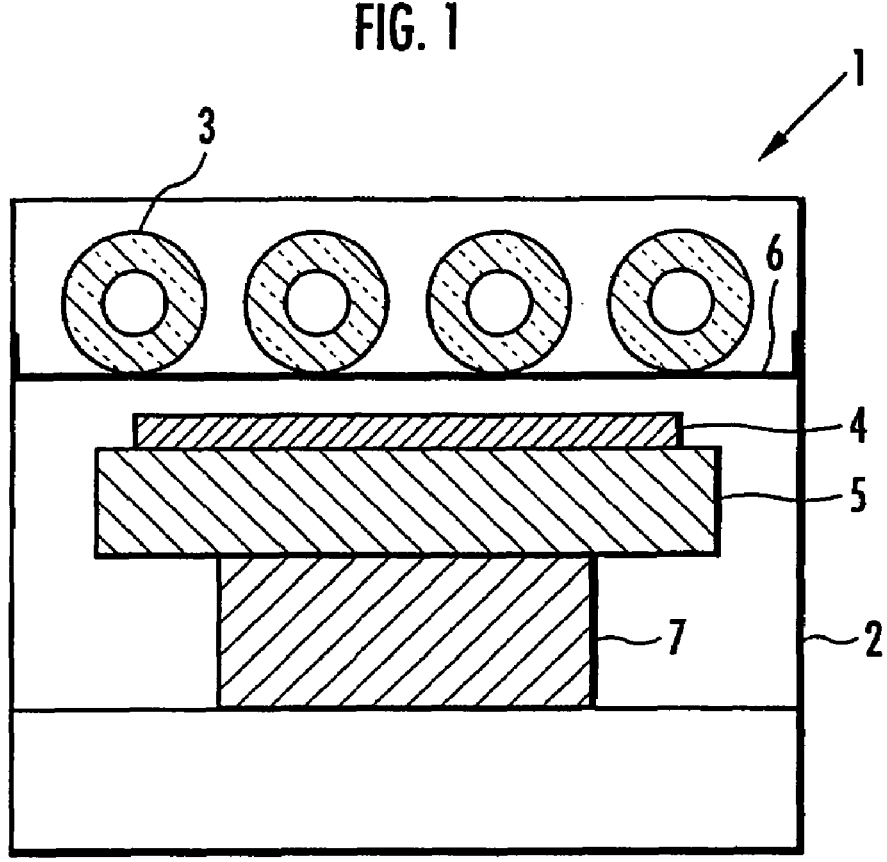
FIG. 1 is an illustrative cross-sectional view showing one constitutive example of an ultraviolet irradiation apparatus to be used in the manufacturing method of the invention.

The above raw carbon nanotubes are irradiated with an ultraviolet ray using ultraviolet irradiation apparatus 1 shown in FIG. 1, for example. Ultraviolet irradiation apparatus 1 is equipped with chamber 2, ultraviolet lamp 3 arranged in chamber 2, sample stage 5 which is arranged below ultraviolet lamp 3 having a predetermined irradiation distance and on which raw carbon nanotubes 4 are to be placed. Ultraviolet lamp 3 is supported by platform member 6 which is arranged in chamber 2. Moreover, sample stage 5 is arranged on freely adjustable elevating stage 7 and the above irradiation distance can be adjusted by moving elevating stage 7 up and down.

Ultraviolet lamp 3 includes a low-pressure mercury lamp, a dielectric barrier discharge excimer lamp, and the like. By the above low-pressure mercury lamp, an ultraviolet ray having a wavelength of 185 nm and an ultraviolet ray having a wavelength of 254 nm are obtained. In addition, by the above dielectric barrier discharge excimer lamp, an ultraviolet ray having a single wavelength of 126 nm, 146 nm, 172 nm, 222 nm, or 308 nm is obtained. In the present embodiment, because of the high photon energy, a vacuum ultraviolet ray having a wavelength of 172 nm obtainable by the irradiation from a dielectric barrier discharge excimer lamp in which xenon gas is included can be particularly preferably employed.

The irradiation of carbon nanotubes 4 with an ultraviolet ray by means of ultraviolet lamp 3 is carried out at an output ranging from 1 to 200 mW/cm$^2$, preferably from 10 to 70 mW/cm$^2$ at an irradiation distance ranging from 0.1 to 100 mm, preferably from 1 to 50 mm over a period ranging from 5 to 600 seconds, preferably from 10 to 600 seconds. In carbon nanotubes 4, the carbon-carbon bonds on the surface are cleaved and, at the same time, the end part(s) is opened. Carbon atoms at the cleaved part and the opened part combine with hydrophilic functional group(s), and thereby the hydrophilic functional group(s) is introduced.

Figure 2:
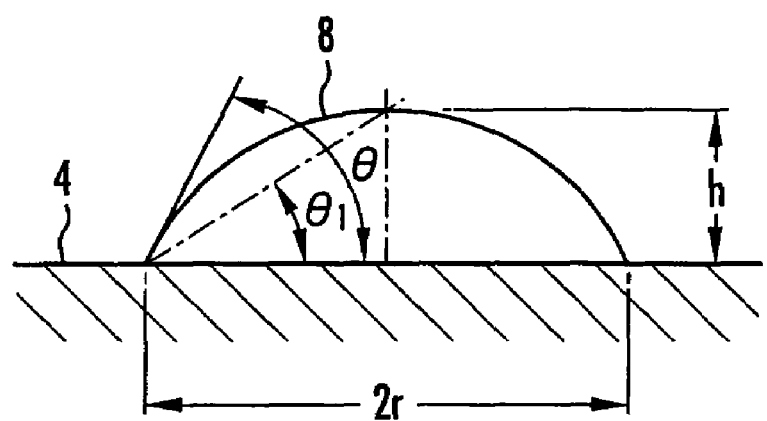
FIG. 2 is an illustrative cross-sectional view showing definition of a contact angle and a calculation method thereof.

As a result, hydrophilicity is imparted to carbon nanotubes 4 to such an extent that a contact angle of water toward carbon nanotubes 4 is in the range of less than 130°, preferably 110° or less, further preferably 10° or less. The above contact angle is represented by an angle θ between a tangent line of water drop 8 of distilled water and the surface of carbon nanotubes 4, as shown in FIG. 2, when the water drop 8 is attached on carbon nanotubes 4.

In the present specification, the contact angle θ is a value calculated according to the following equation (1) from an angle $θ_1$, the angle $θ_1$ represented by $\tan^{-1}$ (h/r) being measured by a commercially available contact angle meter when 4 μl or less of water drop 8 is attached on the carbon nanotubes 4.

$$\text{Contact angle } θ = 2\tan^{-1}(h/r) = 2θ_1 \qquad (1)$$

where h is a height from the surface of carbon nanotubes 4 to the top of water drop 8 and r is a radius of the plane of water drop 8 which comes into contact with the surface of carbon nanotubes 4.

The following will show Examples and Comparative examples of the present invention.

EXAMPLE 1

In the present example, carbon nanotubes were produced by a chemical vapor deposition method (CVD method). In the chemical vapor deposition method, an Fe catalyst having a particle size of 30 nm supported on an $Al_2O_3$ support was first attached onto quartz wool placed in a reactor tube made of quartz glass and the whole was heated to 750° C. under an argon atmosphere. Then, a mixed gas of argon/hydrogen was passed through the reactor tube at a space velocity of 10 cm/second and also hexane as a carbon source was introduced into the reactor tube at a rate of 6 ml/minutes in a state dispersed in the mixed gas of argon/hydrogen. Thus, the hexane introduced into the reactor tube was reacted at 750° C. for 2 hours in the presence of the Fe catalyst. As a result, multilayered carbon nanotubes having a purity of 80% were obtained in the present Example.

Next, the multilayered carbon nanotubes having a purity of 80% were subjected to hot oxidation treatment at 500° C. for 20 minutes in the air to remove amorphous carbon produced simultaneously with the multilayered carbon nanotubes. Then, the multilayered carbon nanotubes were immersed in a 6 mol/l sodium hydroxide solution and allowed to stand for 24 hours to remove the $Al_2O_3$ support. Furthermore, the multilayered carbon nanotubes were washed with 6 mol/l hydrochloric acid to remove the Fe catalyst to obtain multilayered carbon nanotubes having a purity of 97%.

Subsequently, as post treatment, the multilayered carbon nanotubes having a purity of 97% were placed in a graphite crucible and held at a temperature of 2000° C. for 5 hours in a vacuum furnace of 0.01 Pa, followed by cooling to room temperature in vacuo. As a result, multilayered carbon nanotubes having a diameter of 30 nm and an aspect ratio of 100 were obtained. The multilayered carbon nanotubes had formed an aggregate.

Next, 0.3 g of the aggregate of the multilayered carbon nanotubes obtained as mentioned above was immersed in 500 ml of 99.5% ethanol and irradiated with an ultrasonic wave of an output of 150 W for 1 hour to be dispersed. Then, using a disk filter made of polytetrafluoroethylene having a diameter of 47 mm, the above multilayered carbon nanotubes were separated by filtration. Thereafter, the multilayered carbon nanotubes were dried on the above filter to obtain a disk of the carbon nanotubes. The disk had a diameter of 47 mm and a thickness of 0.3 mm.

Then, the above disk was placed, as raw carbon nanotubes 4, on sample stage 5 of the ultraviolet irradiation apparatus 1 and irradiated with an ultraviolet ray by means of ultraviolet lamp 3.

In the present example, using a xenon gas-included dielectric barrier discharge excimer lamp manufactured by Ushio Inc. as ultraviolet lamp 3, hydrophilic carbon nanotubes were produced by irradiation with an ultraviolet ray of 172 nm in the air. The ultraviolet ray was applied under conditions of an output of 17.7 mW/cm$^2$ and an irradiation distance of 1 mm for 10 seconds.

Next, on the hydrophilic carbon nanotubes obtained in the present Example, a contact angle $\theta$ of water toward the carbon nanotubes was measured. Moreover, the end part of the resulting hydrophilic carbon nanotubes was observed by a transmission electron microscope (TEM).

The contact angle $\theta$ is calculated according to the above equation (1) from an angle $\theta_1$ obtained by dropping 2 µl of distilled water on the surface of the disk of the resulting hydrophilic carbon nanotubes and measuring the angle $\theta_1$ by means of a contact angle meter (360D (trade name) manufactured by ERMA Inc.). In the present Example, the distilled water dropped on the surface of the disk of the hydrophilic carbon nanotubes soaked into the above disk within 1 second and thus the contact angle $\theta$ was 0°. The results are shown in Table 1.

Furthermore, the end part of the resulting hydrophilic carbon nanotubes was observed by TEM at a magnification of 75000 times. As a result, it was found that the end part of the hydrophilic carbon nanotubes was opened.

EXAMPLE 2

In the present Example, hydrophilic carbon nanotubes were produced in exactly the same manner as in Example 1 except that the time for the irradiation with the ultraviolet ray was changed to 60 seconds.

On the hydrophilic carbon nanotubes thus obtained, a contact angle $\theta$ was measured in exactly the same manner as in Example 1. In the present Example, the distilled water dropped on the surface of the disk of the hydrophilic carbon nanotubes soaked into the above disk within 1 second and thus the contact angle $\theta$ was 0°. The results are shown in Table 1.

EXAMPLE 3

In the present Example, hydrophilic carbon nanotubes were produced in exactly the same manner as in Example 1 except that the atmosphere in chamber 2 was made a nitrogen atmosphere and the time for the irradiation with the ultraviolet ray was changed to 60 seconds.

On the hydrophilic carbon nanotubes thus obtained, a contact angle $\theta$ was measured in exactly the same manner as in Example 1, whereby the contact angle $\theta$ was found to be 110°. The results are shown in Table 1.

COMPARATIVE EXAMPLE 1

In the present Comparative Example, a contact angle $\theta$ was measured in exactly the same manner as in Example 1 except that a disk of carbon nanotubes 4 obtained in exactly the same manner as in Example 1 without irradiation with any ultraviolet ray was used. In the present Comparative Example, the distilled water dropped on the surface of the disk of carbon nanotubes 4 did not soak into the above disk and the contact angle $\theta$ was found to be 130°. The results are shown in Table 1.

Furthermore, when the end part of carbon nanotubes 4 was observed by TEM at a magnification of 75000 times, it was found that the end part of carbon nanotube 4 remained closed hemispherically.

EXAMPLE 4

Figure 3:
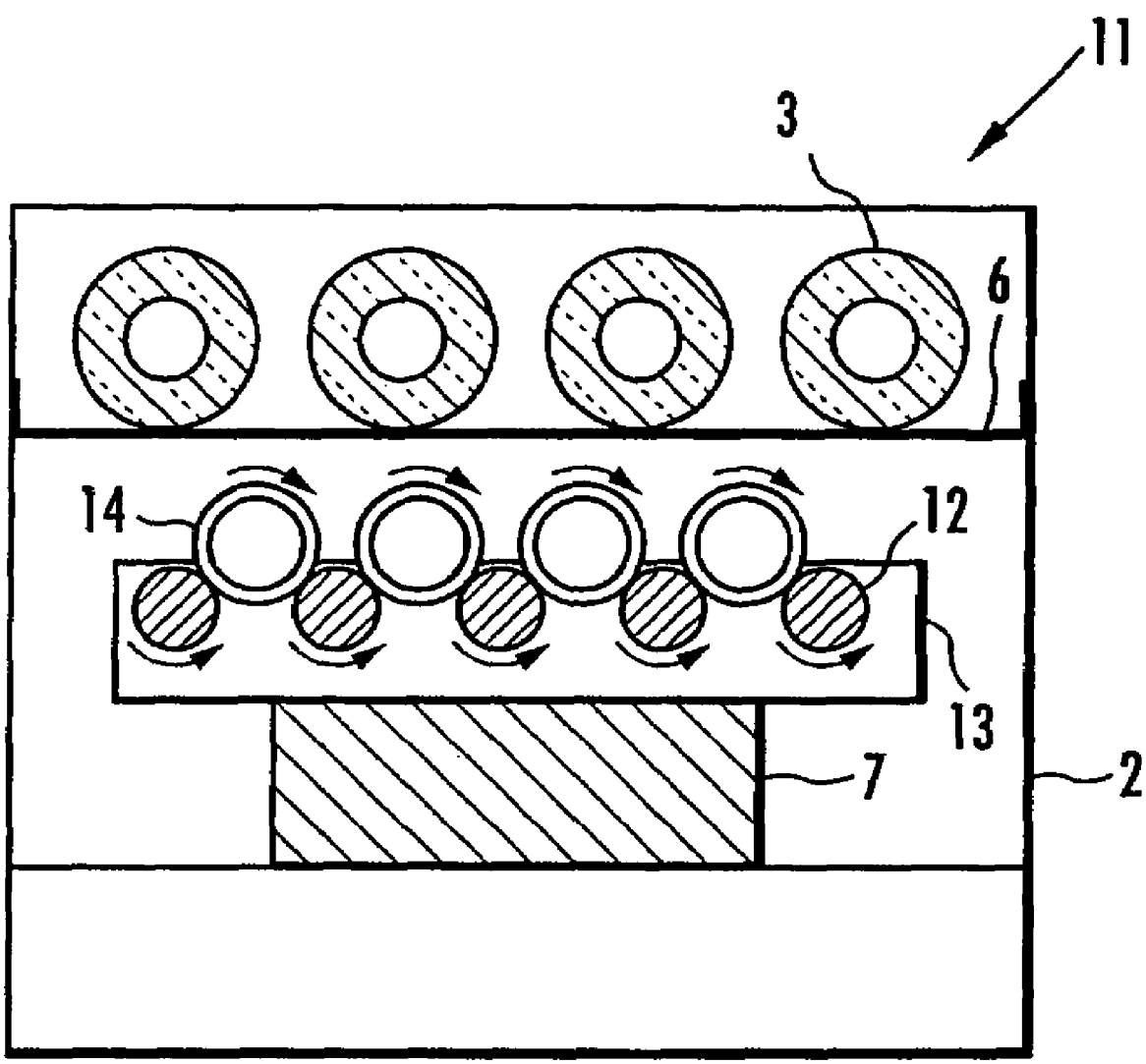
FIG. 3 is an illustrative cross-sectional view showing another constitutive example of an ultraviolet irradiation apparatus to be used in the manufacturing method of the invention.

In the present Example, an aggregate of the multilayered carbon nanotubes obtained in exactly the same manner as in Example 1 were irradiated as a raw carbon nanotubes with an ultraviolet ray using an ultraviolet irradiation apparatus 11 shown in FIG. 3.

The ultraviolet irradiation apparatus 11 shown in FIG. 3 has the same constitution as the ultraviolet irradiation apparatus 1 except that rotating platform 13 which pivotally supports a plurality of rotors 12 parallel-arranged in the horizontal direction is provided instead of sample stage 5. Respective rotors 12 rotate mutually synchronously by motors not shown in the figure and pipes 14 made of synthetic quartz glass containing raw carbon nanotubes (not shown in the figure) are placed between the rotors 12 and 12 and irradiated with an ultraviolet ray by means of ultraviolet lamp 3. Each pipe 14 made of synthetic quartz glass possesses regulating valves for regulating the inner atmosphere at the closed both end parts thereof.

By the ultraviolet irradiation apparatus 11, since pipes 14 can be rotated, the raw carbon nanotubes are stirred in pipes 14 and the carbon nanotubes can be homogeneously irradiated with the ultraviolet ray. Moreover, pipes 14 are placed in chamber 2 but the inside of pipes 14 is separated from the atmosphere of chamber 2. Therefore, the inside of chamber 2 can be made an inert atmosphere such as nitrogen, while the inside of pipes 14 may be made an atmosphere of the air. By making the inside of chamber 2 an inert atmosphere, the attenuation of photon energy of the ultraviolet ray before the ultraviolet ray reaches the carbon nanotubes can be suppressed and thus the case is preferred.

In the present Example, 1 g of the aggregate of the raw carbon nanotubes 4 was first placed in pipes 14 made of synthetic quartz glass having an outer diameter of 40 mm, an inner diameter of 36 mm, and a length of 230 mm and the atmosphere of inside of pipes 14 was made an atmosphere of the air. Carbon nanotubes 4 accounted for ½ of the inner volume of pipe 14.

Then, pipes 14 were placed between rotors 12 and 12 and the atmosphere in chamber 2 was replaced with nitrogen. In that state, while the pipes 14 were rotated at 80 round/minute by rotors 12, hydrophilic carbon nanotubes were produced by irradiation with an ultraviolet ray having a wavelength of 172 nm using a xenon gas-included dielectric barrier discharge excimer lamp manufactured by Ushio Inc. as ultraviolet lamp 3. The ultraviolet ray was applied under conditions of an output of 58 mW/cm$^2$ and an irradiation distance of 50 mm for 300 seconds. In the present Example, the irradiation distance is a distance between the outer surface of ultraviolet lamp 3 and the outer surface of pipe 14.

Next, on the aggregate (volume: about 2 mm$^3$) of the hydrophilic carbon nanotubes obtained in the present Example, a contact angle $\theta$ of water toward the carbon nanotubes was measured in exactly the same manner as in Example 1. In the present Example, the distilled water dropped on the surface of the aggregate of the hydrophilic carbon nanotubes soaked into the above aggregate instantaneously and thus the contact angle θ was 0°. The results are shown in Table 1.

EXAMPLE 5

In the present Example, 0.2 g of the aggregate of raw carbon nanotubes 4 were placed in pipes 14 made of synthetic quartz glass having an outer diameter of 18 mm, an inner diameter of 14 mm, and a length of 200 mm. Then, hydrophilic carbon nanotubes were produced in exactly the same manner as in Example 1 except that the irradiation time with the ultraviolet ray was changed to 600 seconds. Carbon nanotubes 4 accounted for almost the whole inner volume of pipe 14.

When a contact angle θ of water toward the carbon nanotubes was measured in exactly the same manner as in Example 1 on the aggregate (volume: about 2 mm$^3$) of the hydrophilic carbon nanotubes thus obtained, the distilled water dropped on the surface of the aggregate of the hydrophilic carbon nanotubes soaked into the above aggregate instantaneously and thus the contact angle θ was 0°. The results are shown in Table 1.

COMPARATIVE EXAMPLE 2

In the present Comparative Example, a contact angle θ was measured in exactly the same manner as in Example 1 except that an aggregate of carbon nanotubes 4 obtained in exactly the same manner as in Example 1 without irradiation with any ultraviolet ray was used. In the present Comparative Example, the distilled water dropped on the surface of the disk of the hydrophilic carbon nanotubes did not soak into the above disk and the contact angle θ was found to be 132°. The results are shown in Table 1.

TABLE 1

| | Ultraviolet wavelength (nm) | Output (mW/cm$^2$) | Irradiation time (second) | Irradiation distance (mm) | Atmosphere | Contact angle (°) |
|---|---|---|---|---|---|---|
| Example 1 | 172 | 17.7 | 10 | 1 | Air | 0 |
| Example 2 | 172 | 17.7 | 60 | 1 | Air | 0 |
| Example 3 | 172 | 17.7 | 60 | 1 | Nitrogen | 110 |
| Comp. Example 1 | Not irradiated with ultraviolet ray | | | | | 130 |
| Example 4 | 172 | 58 | 300 | 50 | Air | 0 |
| Example 5 | 172 | 58 | 600 | 50 | Air | 0 |
| Comp. Example 2 | Not irradiated with ultraviolet ray | | | | | 132 |

It is apparent from Table 1 that the contact angle θ of water toward carbon nanotube 4 is 130° or more when raw carbon nanotubes 4 are not irradiated with any ultraviolet ray. To the contrary, when raw carbon nanotubes 4 are irradiated with the ultraviolet ray having a wavelength of 172 nm, the contact angle θ of water toward carbon nanotubes 4 is 110° or less and thus it is apparent that hydrophilic carbon nanotubes are obtained.

What is claimed is:

1. A method of manufacturing hydrophilic carbon nanotubes, comprising the steps of introducing hydrophilic functional group(s) into the surface of carbon nanotubes by irradiating the carbon nanotubes with an ultraviolet ray at an output ranging from 10 to 70 mW/cm$^2$, wherein the hydrophilic functional group(s) is one or more groups selected from the group consisting of a hydroxyl group (—OH), a carbonyl group (—CO—), an aldehyde group (—CHO), a carboxyl group (—COOH), a nitro group (—NO$_2$), and an amino group (—NH$_2$).

2. The method of manufacturing hydrophilic carbon nanotubes according to claim 1, wherein hydrophilicity is imparted to the carbon nanotubes to such an extent that a contact angle of water is in the range of less than 130°.

3. The method of manufacturing hydrophilic carbon nanotube according to claim 2, wherein the hydrophilicity is imparted to the carbon nanotubes to such an extent that a contact angle of water is in the range of 110° or less.

4. The method of manufacturing hydrophilic carbon nanotubes according to claim 2, wherein the hydrophilicity is imparted to the carbon nanotubes to such an extent that a contact angle of water is in the range of 10° or less.

5. The method of manufacturing hydrophilic carbon nanotubes according to claim 1, wherein the ultraviolet ray is a far ultraviolet ray having a wavelength ranging from 1 to 190 nm.

6. The method of manufacturing hydrophilic carbon nanotubes according to claim 5, wherein the ultraviolet ray is a far ultraviolet ray obtained by irradiation using a low-pressure mercury lamp.

7. The method of manufacturing hydrophilic carbon nanotubes according to claim 5, wherein the ultraviolet ray is a vacuum ultraviolet ray obtained by irradiation using a xenon gas-included dielectric barrier discharge excimer lamp.

8. The method of manufacturing hydrophilic carbon nanotubes according to claim 7, wherein the vacuum ultraviolet ray has a wavelength of 172 nm.

9. The method of manufacturing hydrophilic carbon nanotubes according to claim 1, wherein the irradiation with the ultraviolet ray is conducted in the presence of oxygen and hydrogen.

10. The method of manufacturing hydrophilic carbon nanotube according to claim 1, wherein the irradiation with the ultraviolet ray is conducted in the presence of ozone and hydrogen.

11. The method of manufacturing hydrophilic carbon nanotubes according to claim 1, wherein the irradiation with the ultraviolet ray is conducted at a distance ranging from 1 to 50 mm.

12. The method of manufacturing hydrophilic carbon nanotubes according to claim 1, wherein the irradiation with the ultraviolet ray is conducted for a time ranging from 10 to 600 seconds.

13. The method of manufacturing hydrophilic carbon nanotubes according to claim 1, wherein the carbon nanotubes are placed in a pipe made of synthetic quartz glass and irradiated with the ultraviolet ray while rotating the pipe made of synthetic quartz glass.

14. The method of manufacturing hydrophilic carbon nanotubes according to claim 1, wherein the end part(s) of the carbon nanotubes is opened by the irradiation with the ultraviolet ray.

* * * * *